(12) United States Patent
Zhang et al.

(10) Patent No.: US 10,871,473 B2
(45) Date of Patent: Dec. 22, 2020

(54) DETECTION OF FREE MANNOSE AND GLUCOSE IN SERUM USING HIGH PERFORMANCE LIQUID CHROMATOGRAPHY

(71) Applicant: THE AFFILIATED HOSPITAL OF QINGDAO UNIVERSITY, Shandong (CN)

(72) Inventors: Lijuan Zhang, Shandong (CN); Yong Liu, Shandong (CN)

(73) Assignee: THE AFFILIATED HOSPITAL OF QINGDAO UNIVERSITY, Qingdao (CN)

( * ) Notice: Subject to any disclaimer, the term of this patent is extended or adjusted under 35 U.S.C. 154(b) by 0 days.

(21) Appl. No.: 16/618,033

(22) PCT Filed: May 29, 2018

(86) PCT No.: PCT/CN2018/088774
§ 371 (c)(1),
(2) Date: Nov. 27, 2019

(87) PCT Pub. No.: WO2018/219258
PCT Pub. Date: Dec. 6, 2018

(65) Prior Publication Data
US 2020/0158696 A1    May 21, 2020

(30) Foreign Application Priority Data
May 29, 2017 (CN) .......................... 2017 1 0394424

(51) Int. Cl.
G01N 30/06 (2006.01)
G01N 30/74 (2006.01)
G01N 30/86 (2006.01)
G01N 30/02 (2006.01)

(52) U.S. Cl.
CPC ............. *G01N 30/06* (2013.01); *G01N 30/74* (2013.01); *G01N 30/8631* (2013.01); *G01N 30/8679* (2013.01); *G01N 2030/027* (2013.01); *G01N 2030/067* (2013.01)

(58) Field of Classification Search
CPC ......... G01N 30/06; G01N 30/74; G01N 30/86
USPC ........................................ 436/87, 94–95, 161
See application file for complete search history.

(56) References Cited

U.S. PATENT DOCUMENTS

| | | | | |
|---|---|---|---|---|
| 4,975,533 A | * | 12/1990 | Kondo | C07H 23/00 436/546 |
| 5,641,390 A | * | 6/1997 | Hawke | C07H 17/04 204/450 |
| 2003/0105301 A1 | | 6/2003 | Li et al. | |
| 2004/0110246 A1 | | 6/2004 | Ebinuma et al. | |
| 2011/0020498 A1 | * | 1/2011 | Broekaert | A23K 20/163 426/71 |
| 2015/0017734 A1 | * | 1/2015 | Han | G01N 33/0098 436/94 |
| 2015/0352540 A1 | * | 12/2015 | Hodge | B01J 31/1805 435/99 |

FOREIGN PATENT DOCUMENTS

| | | |
|---|---|---|
| CN | 1502043 | 6/2004 |
| CN | 101957347 | 1/2011 |
| CN | 102008515 | 4/2011 |
| CN | 102914603 | 2/2013 |
| CN | 103018352 | 4/2013 |
| CN | 103604884 | 2/2014 |
| CN | 103969371 | 8/2014 |
| CN | 104714037 | 6/2015 |
| JP | 2008170428 | 7/2008 |

OTHER PUBLICATIONS

Fu, D. et al, Analytical Biochemistry 1995, 227, 377-384.*
Honda, S. et al, Journal of Chromatography A 1997, 791, 307-311.*
Shen, X. et al, Journal of Chromatography A 1998, 811, 47-59.*
Suzuki, S. et a, Journal of Chromatography A 2001, 910, 319-329.*
Zhang, L. et al, Journal of Chromatography B 2003, 793, 159-165.*
Yamamoto, F. M. et al, Analytica Chimica Acta 2004, 501,143-149.*
Tapie, N. et al, Journal of Chromatography A 2008, 1181, 45-50.*
Sato, T. et al, Research in Veterinary Science 2008, 84, 26-29.*
Lv, Y. et al, Food Chemistry 2009, 112, 742-746.*
Zhang, J. et al, Chinese Journal of Oceanology and Limnology 2009, 27, 578-582.*
Dai, J. et al, Carbohydrate Polymers 2010, 82, 629-635.*
Kuang, H. et al, Carbohydrate Polymers 2011, 84, 1258-1266.*
Harazono, A. et al, Biologicals 2011, 39, 171-180.*
Stepan, H. et al, Analytical Biochemistry 2011, 418, 24-29.*
Rizelio, V. M. et al, Talanta 2012, 93, 62-66.*
Zhang, W.-D. wt al, Journal of Separation Science 2012, 35, 2054-2062.*
Li, H. et al, Biotechnology Letters 2013, 35,1405-1409.*

(Continued)

*Primary Examiner* — Arlen Soderquist

(57) ABSTRACT

Provided is a method of detecting free mannose and glucose in serum using high performance liquid chromatography. Compared to existing technology, the pretreatment process of samples is simpler, the detection time is shortened, and the detection efficiency is greater. When detection of serum samples is carried out, mannose, rhamnose and glucose may be completely separated, and mannose and glucose will not affect each other during quantification, thereby ensuring the accuracy of detection results.

10 Claims, 1 Drawing Sheet

(56) References Cited

OTHER PUBLICATIONS

Wu, X. et al, Food Chemistry 2014, 1455, 976-983.*
Xian, Y. et al, Analytical Methods 2015, 7, 5973-5980.*
Han, Z. et al, Carbohydrate Polymers 2016, 136, 376-383.*
Zhang, T. et al, Analytical and Bioanalytical Chemistry 2016, 408,7403-7411.*
Ai, Y. et al, Journal of Chemistry 2016, Article 6065813, 5 pages.*
Limin, H. et al, Carbohydrate Polymers 2016, 141, 54-59.*
Xi, X. et al, American Journal of Agriculture and Forestry 2015, 4, 156-162.*
Zhang, Q. et al, Marine Sciences 2017, 41, 96-103.*
First Office Action dated Nov. 4, 2019 in priority Chinese Application No. 201710394424.4.
International Search Report dated Aug. 21, 2018 in International Application No. PCT/CN2018/088774.
Written Opinion dated Aug. 21, 2018 in International Application No. PCT/CN2018/088774.

* cited by examiner

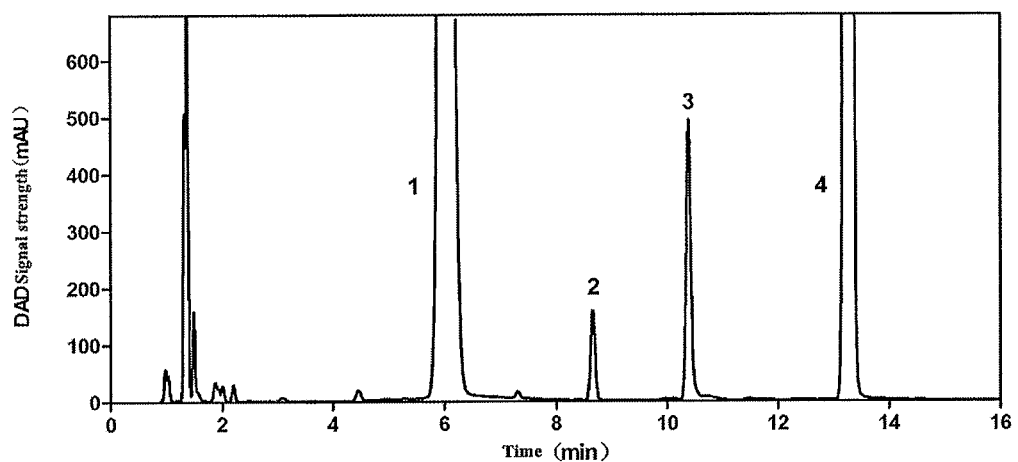

DETECTION OF FREE MANNOSE AND GLUCOSE IN SERUM USING HIGH PERFORMANCE LIQUID CHROMATOGRAPHY

FIELD OF THE TECHNOLOGY

The present invention relates to the field of medicine, and particularly relates to detection of monosaccharide in serum, in particular to detection of free mannose and glucose in serum using High Performance Liquid Chromatography (HPLC).

BACKGROUND

The content of glucose (Glc) in free monosaccharide in human serum is the highest, the normal range is 3.9-6.16 mmol/L, and the content of mannose (Man) is about 1% of the content of glucose. In eukaryotic cells, oligosaccharides composed of 14 monosaccharides (containing 9 mannose, 3 glucose and 2 N-acetylglucosamine) are transferred from the endoplasmic reticulum to the N-sugar chain-linking site of most newly synthesized proteins. Six of the nine mannoses in the Golgi can be removed to varying degrees, with the oligosaccharides acting as substrates to form high mannose type, hybrid type or complex N-sugar chains, while the mannose moves in the Golgi network along with the N-sugar chain-linked glycoprotein and is eventually released outside the cell. The N-glycation mechanism of proteins explains the widespread presence of mannose in animal serum. Researches show that free monosaccharide in serum of a diabetic patient, except that glucose is obviously increased, the content of mannose is higher than a normal person. Abnormal protein glycosylation has been reported to be associated not only with diabetes, but also with other metabolic syndromes, including cancer and other complex diseases. Therefore, detecting glucose and mannose concentrations in human serum will provide novel molecular level information for the treatment of genetic diseases and diagnosis of patients with diabetes and other protein glycosylation abnormalities.

According to early research reports (before 2008), methods for detecting mannose in blood include high performance liquid chromatography, capillary electrophoresis, and enzymatic methods. Jamnes R. ETCHISION et al. (*Clinical Chemistry* 43, No 3,1997, 533-538) analyzed free mannose in serum using enzymatic methods by high performance anion exchange chromatography with a pulsed current detector. According to this method, the mannose can be detected only by removing high-content glucose through a very complex pretreatment step, and the using amount of serum is 200μ. Hubert A et al. (*Clinical Chemistry* 47, No 7, 2001, 1319-1321) analyzed free mannose in serum by capillary electrophoresis using a pre-column derivatization method. The analysis time of the method is only 8 minutes, but the mannose can be detected by removing high-content glucose through a very complicated pretreatment step. Tadao Taguchi et al. (*Clinical Chemistry* 49, No 1, 2003, 181-183) measured free mannose in plasma by high performance liquid chromatography using a post-column derivatization method, the chromatography column being an anion exchange column and the detector being a fluorescence detector. The analysis time of the method is 57 min, and the mannose can be detected only by removing high-content glucose through a complicated pretreatment step; and post-column derivation is used, so that the requirement on equipment is high.

In conclusion, the common characteristic of these methods is that mannose can be detected only by removing high-content glucose first, so the pretreatment steps are complicated and the operation process is complex. In 2008, Sato et al. (*Research in Veterinary Science* 84 (2008) 26-29) used ethyl p-Aminobenzoate (ABEE) as a derivatization reagent for serum monosaccharides, separated different monosaccharides by high performance liquid chromatography, and detected glucose by an ultraviolet detector and detected mannose by a fluorescence detector, thereby realizing simultaneous quantitative analysis of glucose and mannose in dog and chicken serum for the first time. According to this method, the serum is 100 μL, and two standard curves of two detectors are needed to quantify glucose and mannose respectively. The method has not been used for quantitative and qualitative analysis of glucose and mannose in human serum.

The invention patent CN 103969371B disclosed "the application of a method for obtaining and detecting monosaccharide by blood degradation in cancer detection". In this invention patent, firstly, a serum sample is degraded by using acid to degrade polysaccharide and glycoprotein in the serum sample into monosaccharide components; then, 8 monosaccharides are obtained after detecting degradation through PMP derivation and high performance liquid chromatography. The sample composition and properties have changed dramatically compared to the serum before degradation. Therefore, the method described in the patent is only suitable for the detection of serum after degradation, but not suitable for the direct detection of serum. In addition, the method adopts high performance liquid chromatography, which has long detection time and low efficiency. Due to the limitation of the detection method, the intensive research on free mannose in serum is hindered to some extent. Therefore, the establishment of a high-efficiency and accurate detection method of free mannose in serum has very important significance for researching the relation between free monosaccharide in serum and diseases and searching for markers for clinical detection of diseases.

Currently, the PMP derivation method of monosaccharide is a commonly used monosaccharide detection method. Although the method is widely applied in various fields, the application of the method to the detection of free mannose and glucose in serum has not been reported at present. The method comprises the following steps: (1) creating an alkaline condition for the PMP, (2) adding PMP and derivatizing at 70 ° C., (3) adjusting the pH of the derivatized solution to extract the residual PMP. The creating reagent under the alkaline condition in the step (1) comprises sodium hydroxide and ammonia water. Ammonia water is used as an alkaline condition to create a reagent, neutralization is not needed after derivatization is finished, the ammonia water after reaction is removed by drying or evaporating, and the loss rate of monosaccharide in the PMP extraction process is low. However, the ammonia water cannot be removed completely, resulting in that the extraction condition of the sample is alkaline, and when liquid phase detection is performed, the PMP residue is quite severe, and the chromatographic peak type is extremely bad. When sodium hydroxide is used as an alkaline for creating reagent, the derived sample needs to be adjusted to neutral by hydrochloric acid, and extraction is performed under a neutral condition. The residue of PMP is reduced significantly and the chromatographic peak type is excellent, but the recovery rate of mannose is only 80%, and the interference of impurity peaks behind the galactosamine and glucuronic acid seriously affects the quantitative result.

When the monosaccharide after PMP derivatization is subjected to HPLC analysis, a full-porous C18 chromatographic column is used in all the domestic and abroad reports. The existing HPLC analysis method of the monosaccharide after PMP derivatization not only consumes longer time, but also can not complete the analysis of the samples of a plurality of monosaccharide components in a short time.

SUMMARY

Based on the current situation regarding detection of free mannose and glucose in serum in existing technology, the present invention provides a HPLC analysis method of free mannose and glucose in serum, which is applied to the measurement of free glucose and mannose in serum. The present method realizes simple pretreatment, short detection time and accurate detection results. A new door is widely opened for the research of relationship between free monosaccharide in serum and diseases.

Technical solution of the present invention : a detection method of high performance liquid chromatography of free mannose and glucose in serum comprises the following steps:

(1) serum free monosaccharide derivation:

① taking a proper amount of serum sample, sequentially adding ultrapure water, rhamnose (Rha) solution, sodium hydroxide solution and 1-phenyl-3-methyl-5-pyrazolone (PMP) solution into the serum sample, mixing to obtain a system with pH=7-14, centrifuging after mixing, and reacting in an oven at 70° C. for 1 hour to obtain a sample A; the volume of the serum is 10 µL, the volume of the ultrapure water is 20 µL, the concentration of the rhamnose solution in is 0.1 mg/ml, the volume of the rhamnose solution in is 10 µL, and the molar ratio of the NaOH to the PMP is 2:5.

② cooling the sample A to room temperature, adding a proper amount of HCl solution, mixing to obtain a system with the pH=1-7, centrifuging, extracting with chloroform for 3 times, and taking the supernatant each time to obtain a sample B; the molar ratio of the HCl to the NaOH is 1.5: 1-2.5: 1. By adjusting the derived solution to acidity directly and extracting residual PMP, therefore eliminating the influence of impurity peaks on the quantification of monosaccharide, and reducing the loss rate of monosaccharide.

③ carrying out high-speed centrifugal treatment on the sample B to obtain a sample C; the high-speed centrifugation is carried out at a speed of 13000 r/min for 10 min.

(2) detecting the sample C obtained in the step (1) using high performance liquid chromatography; the detection method is an external standard method, and simultaneously rhamnose which does not exist in human body is used as internal reference monosaccharide. The steps of the external standard method comprises:

① drawing a standard curve: taking 40 µL of a mixed solution of mannose (Man) and glucose (Glc) standard substances with the concentration of 0.5, 0.25, 0.10, 0.05, 0.025, 0.01, 0.005, 0.0025, 0.001 and 0.0005 mg/mL, adding 40 µL of 0.3M NaOH solution, adding 60 µL of 0.5M PMP solution, and reacting in an oven at 70° C. for 1 hour; taking out the reactant, cooling to room temperature, adding 80 µL of 0.3M HCl, extracting $CHCl_3$ for three times; centrifuging at 13000 r/min for 10 min; then using high performance liquid chromatography to detect and analyze respectively, and drawing a standard curve by taking the concentration of monosaccharide as a horizontal coordinate and taking the corresponding peak area as a vertical coordinate;

② detecting the sample to be detected: taking 10 µL of serum sample to be detected, adding 20 µL of ultrapure water and 10 µL of 0.1 mg/ml rhamnose solution, and deriving and sampling; calculating the content of free mannose and glucose in the serum sample to be detected by using the standard curve obtained in the step (1).

The high performance liquid chromatography is an Agilent 1260 high performance liquid system, Agilent Porohell EC-C18 chromatography column (4.6×100 mm 2.7 µm). The conditions of high performance liquid chromatography are as follows: (1) detection wavelength: 254 nm; reference wavelength: 360 nm; (2) mobile phase: acetate with PH=5.5 as salt phase, acetonitrile as organic phase; the acetate with pH=5.5 has no impurity precipitation under this condition, so that the blockage of the chromatography column is avoided, and the perfect peak shape in the linear range of the external standard method is ensured. Gradient elution: 0→10→15→20 min; concentration gradient of acetonitrile: 15%→22%→24%→15%; concentration gradient of 0.10 mol/L ammonium acetate buffer solution (PH=5.5): 85%→78%→76%→85%; the gradient mode can perfectly separate 8 monosaccharides and shorten the analysis time as much as possible; (3) column temperature: 25-50° C.; (4) flow rate: 1.0 mL/min; (5) sample volume: 20 µL; (7) chromatography column flushing solvent: flushing the chromatography column with water and acetonitrile containing 0.1% trifluoroacetic acid. By adding 0.1% trifluoroacetic acid into the mobile phase, the pH value of the flushed mobile phase is adjusted to acidtity, so that the precipitation of protein and polypeptide substances in a serum sample under the conditions of near neutrality and alkalinity is avoided, and the blockage of a chromatography column is avoided.

Preferably, the high performance liquid chromatography conditions are as follows: detection wavelength: 254 nm, bandwidth 4 nm; reference wavelength: 350 nm, bandwidth 100 nm; column temperature: 37° C.; flow rate: 1 mL/min; sample volume: 20 µL.

An application of a detection method of high performance liquid chromatography of free mannose and glucose in serum for protein glycosylation abnormal diseases, wherein: the detection sample is serum of a patient with protein glycosylation abnormal diseases.

An application of a detection method of high performance liquid chromatography of free mannose and glucose in serum for protein glycosylation abnormal diseases, wherein: the protein glycosylation abnormal disease includes diabetes and gastric cancer.

Investigation of Methodology Performance

In order to fully verify the practicability of the detection method, the inventor investigate from three angles: precision, accuracy and repeatability.

(1) Precision Experiment:

Deriving two kinds of monosaccharide mixed solution with the concentration of 0.5 mg/mL, continuously feeding the sample for five times, recording the peak areas of mannose and glucose, and calculating the precision RSD values of the mannose and glucose. As shown in Table 1-1, the RSD values of the two monosaccharides were 1.88% and 0.40% respectively, indicating that the precision of the experiment was good.

TABLE 1-1

Precision Experiment

| Monosaccharide | Peak Area 1 | Peak Area 2 | Peak Area 3 | Peak Area 4 | Peak Area 5 | RSD (%) |
|---|---|---|---|---|---|---|
| Man | 14446.9 | 14036.1 | 14345.6 | 14482.9 | 13874.5 | 1.88 |
| Glc | 12857.8 | 12830.7 | 12756.8 | 12737.8 | 12820.3 | 0.40 |

(2) Stability Experiment:

Deriving two kinds of monosaccharide mixed solution with the concentration of 0.1 mg/mL, and feeding samples at 0 h, 2 h, 4 h, 8 h, 16 h and 24 h respectively, recording peak areas of mannose and glucose, and calculating the precision RSD values. As shown in Table 1-2, the RSD values of the two monosaccharides were 0.30% and 0.44% respectively, indicating that the stability of the experiment was good.

TABLE 1-2

Stability Experiment

| Monosaccharide | Peak Area (0 h) | Peak Area (2 h) | Peak Area (4 h) | Peak Area (8 h) | Peak Area (16 h) | Peak Area (24 h) | RSD (%) |
|---|---|---|---|---|---|---|---|
| Man | 2707.8 | 2713.8 | 2701.4 | 2707.4 | 2722.2 | 2720.7 | 0.30 |
| Glc | 2212.2 | 2223.1 | 2219.9 | 2225.1 | 2235.6 | 2238.1 | 0.44 |

(3) Repeatability Experiment:

Taking three samples of mixed serum of 20 normal persons respectively, and feeding samples and analysis are carried out after this method is used for derivation, then recording mannose and glucose. The precision RSD values of the samples are calculated. As shown in Table 1-3, the RSD values of two monosaccharides are 1.59% and 1.67% respectively, indicating that the repeatability of the experiment was good.

TABLE 1-3

Repeatability Experiment

| Monosaccharide | Peak Area 1 | Peak Area 2 | Peak Area 3 | RSD (%) |
|---|---|---|---|---|
| Man | 3860.7 | 3909.2 | 3984.5 | 1.59 |
| Glc | 7520.5 | 7488.1 | 7721.8 | 1.67 |

In conclusion, the high performance liquid chromatography detection method for free mannose and glucose in serum disclosed by the patent application of the invention has the advantages that the precision, the stability and the repeatability experiment of RSD are all less than 2%; indicating the method is reliable and can be used for determining the monosaccharide composition in serum.

Mannose Influencing Factor Experiments:

(1) Mannose Recovery Rate Experiment:

10 μl of 10, 50, 100 and 500 μmannose standard solution is added into 20 mixed serum samples, and deriving samples is carried out to investigate whether the mannose detection is influenced by the derivative process and the serum environment. Experimental results show that the derivation process and the serum environment hardly influence the recovery and detection of mannose, the SD is below 4.3%, and the recovery rate of mannose is close to 100% (Table 2-1).

TABLE 2-1

Serum Mannose Recovery Rate Experiment

| Man Concentration (μmol/L) | Man Recovery Rate (%) | Standard Deviation (%) |
|---|---|---|
| 10 | 101.5 | 2.7 |
| 50 | 97.4 | 4.3 |
| 100 | 101.2 | 3.0 |
| 500 | 101.2 | 0.5 |

(2) Glucose Impact Experiment:

Studies have shown that glucose produces mannose tautomers under weak alkaline conditions. To verify whether the reaction also existed under the weak alkaline condition derived from serum free glucose and mannose PMP, 20 samples of mixed serum from diabetic patients were derivatized by adding 0.5, 0.25, 0.1 mg/mL glucose solution. As shown in Table 2-2, the detection of mannose did not change with the glucose content, indicating that high concentrations of glucose did not affect the measurement of mannose under the derivatization conditions.

TABLE 2-2

Impact of Different Concentrations of Glucose On Mannose Detection

| Glc Concentration (mg/mL) | Detected Man Concentration (μmol/L) |
|---|---|
| 0 | 44.7 |
| 0.1 | 45.2 |
| 0.25 | 46.9 |
| 0.5 | 42.9 |

The invention has the beneficial effect that: compared with the prior art, the high performance liquid chromatography detection method for serum free mannose and glucose has the following advantages:

(1) Compared with other detection methods, the pretreatment process of the sample is simpler, the detection time is shortened, and the detection efficiency is improved;

(2) compared with the existing HPLC detection method after monosaccharide derivatization, the method has shorter analysis time, and can complete analysis within 20 minutes;

(3) when using present invention to detect a serum sample, mannose, rhamnose and glucose can be completely separated, and the mannose and the glucose do not influence each other when being quantified; thereby ensuring the accuracy of the detection result.

BRIEF DESCRIPTION OF THE DRAWINGS

FIG. 1 is a high performance liquid chromatography peak of mannose, rhamnose and glucose.

DETAILED DESCRIPTION

The present invention will be further illustrated with reference to the following examples.

Embodiment 1: Drawing Standard Curve of External Standard Method.

(1) Monosaccharide derivation: taking 40 μL of a mixed solution of mannose and glucose standard substances with the concentration of 0.5, 0.25, 0.10, 0.05, 0.025, 0.01, 0.005, 0.0025, 0.001 and 0.0005 mg/mL, adding 40 μL of 0.3M NaOH solution, adding 60 μL of 0.5M PMP solution, and reacting in an oven at 70° C. for 1 hour; taking out the reactant, cooling to room temperature, adding 80 μL of 0.3M HCl, extracting CHCl₃ for three times; centrifuging at 13000 r/min for 10 min;

(2) Detecting and analyzing by high performance liquid chromatography, and drawing a standard curve (see Table 3) by taking the concentration of monosaccharide as a horizontal coordinate and taking the corresponding peak area as a vertical coordinate.

The high performance liquid chromatography is an Agilent 1260 high performance liquid system, an Agilent Porohell EC-C18 chromatography column: (4.6×100 mm 2.7 μm). The conditions of high performance liquid chromatography are as follows: (1) detection wavelength: 254 nm, bandwidth 4 nm; reference wavelength: 360 nm; bandwidth 100 nm; (2) mobile phase: acetate with PH=5.5 as salt phase, acetonitrile as organic phase; the acetate with pH=5.5 has no impurity precipitation under the condition, so that the blockage of a chromatography column is avoided, and the perfect peak shape in the linear range of an external standard method is ensured. Gradient elution: 0→10→15→20 min; concentration gradient of acetonitrile: 15%→22%→24%→15%; concentration gradient of 0.10 mol/L ammonium acetate buffer solution (PH=5.5): 85%→78%→76%→85%; the gradient mode can perfectly separate 8 monosaccharides and shorten the analysis time as much as possible; (3) column temperature:37° C.; (4) flow rate: 1 mL/min; (5) sample volume: 20 μL; (7) chromatography column flushing solvent: flushing the chromatography column with water and acetonitrile containing 0.1% trifluoroacetic acid. By adding 0.1% trifluoroacetic acid into the mobile phase, the pH value of the flushed mobile phase is adjusted to acidic, so that the precipitation of protein and polypeptide substances in a serum sample under the conditions of near neutrality and alkalinity is avoided, and the blockage of a chromatography column is avoided.

TABLE 3

Standard Curve of Mannose and Glucose External Standard Method Detection

| Monosaccharide | Regression Equation | Correlation Coefficient r² | Linear Range/ mg/mL |
|---|---|---|---|
| Man | y = 27993x − 4.606 | 0.9999 | 0.0005-0.5 |
| Glc | y = 23604x + 7.285 | 0.9998 | 0.0005-0.5 |

As shown in FIG. 1, the high-performance liquid chromatography method using the above conditions, mannose, rhamnose and glucose can be separated completely, and the chromatographic peak shape is excellent. Peak 1, peak 2, peak 3, peak 4 is the peak of PMP, Man, Rha and Glc respectively.

Embodiment 2: Detection of Free Mannose and Glucose in Normal Human Serum.

(1) serum free monosaccharide derivation:

① taking 10 μL serum samples from 13 normal persons, sequentially adding 20 μL of ultrapure water, 10 μL of 0.1 mg/ml rhamnose, 40 μL of 0.3M NaOH, 60 μL of 0.5M 1-phenyl-3-methyl-5-pyrazolone solution, centrifuging after mixing, and reacting in an oven at 70° C. for 1 hour to obtain a sample A;

② taking out the reactant from step (1), cooling to room temperature, adding 80 μL of 0.3M HCl, and extracting with CHCl₃ for three times to obtain sample B. By adjusting the derived solution to acidity and extracting residual PMP, therefore eliminating the influence of impurity peak on monosaccharide quantification and reducing the loss rate of monosaccharide.

③ centrifuging the sample B at the speed of 13000 r/min for 10 min to obtain a sample C.

(2) detecting the sample C by high performance liquid chromatography: calculating the contents of free mannose and glucose in the serum sample to be measured according to the peak area obtained by analysis and the standard curve obtained in embodiment 1.

The high performance liquid chromatography is an Agilent 1260 high performance liquid system, Agilent Porohell EC-C18 chromatography column (4.6×100 mm 2.7 μm). The conditions of high performance liquid chromatography are as follows: (1) detection wavelength: 254 nm, bandwidth 4 nm; reference wavelength: 350 nm, bandwidth 100 nm; (2) mobile phase: acetate with PH=5.5 as salt phase, acetonitrile as organic phase; the acetate with pH=5.5 has no impurity precipitation under this condition, so that the blockage of the chromatography column is avoided, and the perfect peak shape in the linear range of the external standard method is ensured. Gradient elution: 0→10→15→20 min; concentration gradient of acetonitrile: 15%→22%→24%→15%; concentration gradient of 0.10 mol/L ammonium acetate buffer solution (PH=5.5): 85%→78%→76%→85%; the gradient mode can perfectly separate 8 monosaccharides and shorten the analysis time as much as possible; (3) column temperature: 37° C.; (4) flow rate: 1.0 mL/min; (5) sample volume: 20 μL; (7) chromatography column flushing solvent: flushing the chromatography column with water and acetonitrile containing 0.1% trifluoroacetic acid. By adding 0.1% trifluoroacetic acid into the mobile phase, the pH value of the flushed mobile phase is adjusted to acidtity, so that the precipitation of protein and polypeptide substances in a serum sample under the conditions of near neutrality and alkalinity is avoided, and the blockage of a chromatography column is avoided.

Embodiment 3: Detecting Free Mannose and Glucose in Normal Human Serum.

The differences with embodiment 2 are:

(1) serum free monosaccharide derivation: ② taking out the reactant treated in the oven in the step ①, cooling to room temperature, adding 60 μL of 0.3M HCl, and extracting with CHCl₃ for 3 times to obtain the sample B.

(2) detecting the sample C by high performance liquid chromatography: the conditions of high performance liquid chromatography are as follows: (3) column temperature 25° C.

Embodiment 4: Detecting Free Mannose and Glucose in Normal Human Serum.

The differences with embodiment 2 are:

(1) serum free monosaccharide derivation: ② taking out the reactant treated in the oven in the step ①, cooling to room temperature, adding 85 μL of 0.3M HCl, and extracting with CHCl₃ for 3 times to obtain the sample B.

(2) detecting the sample C by high performance liquid chromatography: the conditions of high performance liquid chromatography are as follows: (3) column temperature 30° C.

Embodiment 5: Detecting Free Mannose and Glucose in Serum of Diabetic Patients.

(1) serum free monosaccharide derivation:

① taking 10 μL serum samples from 13 diabetic patients, sequentially adding 20 μL of ultrapure water, 10 μL of 0.1 mg/ml rhamnose, 40 μL of 0.3M NaOH, 60 μL of 0.5M 1-phenyl-3-methyl-5-pyrazolone solution, centrifuging after mixing, and reacting in an oven at 70° C. for 1 hour to obtain a sample A;

② taking out the reactant from oven in step ①, cooling to room temperature, adding 80 μL of 0.3M HCl, and extracting with CHCl₃ for three times to obtain sample B.

③ centrifuging the sample B at the speed of 13000 r/min for 10 min to obtain a sample C.

(2) detecting the sample C by high performance liquid chromatography: calculating the contents of free mannose and glucose in the serum sample to be measured according to the peak area obtained by analysis and the standard curve obtained in embodiment 1. The high performance liquid chromatography is an Agilent 1260 high performance liquid system, Agilent Porohell EC-C18 chromatography column (4.6×100 mm 2.7 μm). The conditions of high performance liquid chromatography are as follows: (1) detection wavelength: 254 nm; reference wavelength: 360 nm; (2) mobile phase: acetate with PH=5.5 as salt phase, acetonitrile as organic phase; gradient elution: 0→10→15→20 min; concentration gradient of acetonitrile: 15%→22%→24%→15%; concentration gradient of 0.10 mol/L ammonium acetate buffer solution (PH=5.5): 85%→78%→76%→85%; (3) column temperature: 37° C.; (4) flow rate: 1.0 mL/min; (5) sample volume: 20 μL; (7) chromatography column flushing solvent: flushing the chromatography column with water and acetonitrile containing 0.1% trifluoroacetic acid.

Embodiment 6: Detecting Free Mannose and Glucose in Serum of Diabetic Patients.

The differences with embodiment 5 are:

(1) serum free monosaccharide derivation: ② taking out the reactant treated in the oven in the step ①, cooling to room temperature, adding 90 μL of 0.3M HCl, and extracting with CHCl₃ for 3 times to obtain the sample B.

(2) detecting the sample C by high performance liquid chromatography: the conditions of high performance liquid chromatography are as follows: (3) column temperature 35° C.

Embodiment 7: Detecting Free Mannose and Glucose in Serum of Diabetic Patients.

The differences with embodiment 5 are:

(1) serum free monosaccharide derivation: ② taking out the reactant treated in the oven in the step ①, cooling to room temperature, adding 70 μL of 0.3M HCl, and extracting with CHCl₃ for 3 times to obtain the sample B.

(2) detecting the sample C by high performance liquid chromatography: the conditions of high performance liquid chromatography are as follows: (3) column temperature 40° C.

Embodiment 8: Detecting Free Mannose and Glucose in Serum of Gastric Cancer Patients.

(1) serum free monosaccharide derivation:

① taking 10 μL serum samples from 13 gastric cancer patients, sequentially adding 20 μL of ultrapure water, 10 μL of 0.1 mg/ml rhamnose, 40 μL of 0.3M NaOH, 60 μL of 0.5M 1-phenyl-3-methyl-5-pyrazolone solution, centrifuging after mixing, and reacting in an oven at 70° C. for 1 hour to obtain a sample A;

② taking out the reactant from oven in step ①, cooling to room temperature, adding 80 μL of 0.3M HCl, and extracting with CHCl₃ for three times to obtain sample B.

③ centrifuging the sample B at the speed of 13000 r/min for 10 min to obtain a sample C.

(2) detecting the sample C by high performance liquid chromatography: calculating the contents of free mannose and glucose in the serum sample to be measured according to the peak area obtained by analysis and the standard curve obtained in embodiment 1.

The high performance liquid chromatography is an Agilent. 1260 high performance liquid system, Agilent Porohell EC-C18 chromatography column (4.6×100 mm 2.7 μm). The conditions of high performance liquid chromatography are as follows: (1) detection wavelength: 254 nm; reference wavelength: 360 nm; (2) mobile phase: acetate with PH=5.5 as salt phase, acetonitrile as organic phase; gradient elution: 0→10→15→20 min; concentration gradient of acetonitrile: 15%→22%→24%→15%; concentration gradient of 0.10 mol/L ammonium acetate buffer solution (PH=5.5): 85%→78%→76%→85%; (3) column temperature: 37° C.; (4) flow rate: 1.0 mL/min; (5) sample volume: 20 μL; (7) chromatography column flushing solvent: flushing the chromatography column with water and acetonitrile containing 0.1% trifluoroacetic acid.

Embodiment 9: Detecting Free Mannose and Glucose in Serum of Gastric Cancer Patients.

The differences with embodiment 8 are:

(1) serum free monosaccharide derivation: ② taking out the reactant treated in the oven in the step ①, cooling to room temperature, adding 100 μL of 0.3M HCl, and extracting with CHCl₃ for 3 times to obtain the sample B.

(2) detecting the sample C by high pedal' lance liquid chromatography: the conditions of high performance liquid chromatography are as follows: (3) column temperature 45° C.

Embodiment 10: Detecting Free Mannose and Glucose in Serum of Gastric Cancer Patients.

The differences with embodiment 8 are:

(1) serum free monosaccharide derivation: ② taking out the reactant treated in the oven in the step ①, cooling to room temperature, adding 75 μL of 0.3M HCl, and extracting with CHCl₃ for 3 times to obtain the sample B.

(2) detecting the sample C by high performance liquid chromatography: the conditions of high performance liquid chromatography are as follows: (3) column temperature 50° C.

TABLE 4

Detected content of serum free glucose and mannose of embodiment 2-10

| Sample Type | Embodiment | Mannose (μmol/L) | Glucose (μmol/L) | Analysis time (min) |
|---|---|---|---|---|
| Normal Person | Embodiment 2 (13 samples) | 52.5 | 4674.8 | 20.0 |
|  | Embodiment 3 (13 samples) | 53.9 | 4627.3 | 20.3 |
|  | Embodiment 4 (13 samples) | 52.6 | 4608 | 20.2 |
| Diabetic Patients | Embodiment 5 (13 samples) | 102.7 | 7854.5 | 20.0 |
|  | Embodiment 6 (13 samples) | 101.9 | 7882.1 | 20.0 |
|  | Embodiment 7 (13 samples) | 102.3 | 7881.8 | 20.0 |
| Gastric cancer patients | Embodiment 8 (13 samples) | 89.7 | 4813.0 | 20.0 |
|  | Embodiment 9 (13 samples) | 87.8 | 4746.0 | 19.9 |
|  | Embodiment 10 (13 samples) | 90.2 | 4750.1 | 19.8 |

According to embodiment 2-10, the serum free mannose and glucose contents of 39 normal persons, 39 diabetes patients and 39 gastric cancer patients were detected by the method of the present invention, and the results are shown in table 4. From the results of embodiment 2 to 4, it was found that the serum mannose concentration of normal persons was much lower than diabetic patients and gastric cancer patients. It fully explains that the concentration of serum free mannose is indeed related to diseases with abnormal glycosylation of proteins such as diabetes, gastric cancer, ect; therefore, the method of the present invention has very important significance for researching the relation between the free monosaccharide in the serum and the disease and searching the marker for clinical detection of the diseases.

In addition, as shown in table 4, compared with the existing monosaccharide derived HPLC detection method, the method provided by the present invention shortens the detection time to about 20 min, and improves the detection efficiency; and the data parallelism is good, and the precision, the accuracy and the repeatability of the method are fully proved.

What is claimed is:

1. A method of detecting free mannose and glucose in serum, using high performance liquid chromatography comprising:
    a) generating serum free monosaccharide comprising:
        (i) sequentially adding: ultrapure water, rhamnose solution, NaOH solution and 1-phenyl-3-methyl-5-pyrazolone solution into a serum sample and mixing to obtain a solution with a pH between 7-14, centrifuging the solution, and heating the solution for a predetermined time to obtain a sample A;
        (ii) cooling sample A to room temperature, adding HCl solution, mixing to obtain a solution with a pH between 1-7, centrifuging the solution, extracting with chloroform, wherein the supernatant becomes sample B; and
        (iii) centrifuging sample B at high-speed to obtain a sample C; and
    b) detecting sample C using high performance liquid chromatography; wherein the detection method is an external standard method, and rhamnose is used as internal reference monosaccharide.

2. The method of claim 1, wherein:
NaOH and 1-phenyl-3 methyl-5-pyrazolone in step a) are in a molar ratio of 2:5; and HCl and NaOH in a) are in a molar ratio of 1.5-2.5: 1.

3. The method of claim 1, wherein:
the volume of the serum sample in step a) is 10 μL, the volume of the ultrapure water in step a) is 20 μL, the concentration of the rhamnose solution in a) is 0.1 mg/ml, and the volume of the rhamnose solution in a) is 10 μL;
the solution in step (i) is heated to 70° C., for 1 hour; and high-speed in step (iii) is a speed of 13000 r/min.

4. The method of claim 3, wherein sample B is centrifuged for 10 minutes.

5. The method of claim 1, wherein,
the high performance liquid chromatography is performed on an Agilent 1260 high performance liquid system, an Agilent Porohell EC-C18 chromatography column (4.6×100 mm 2.7 μm); and wherein the parameters of the high performance liquid chromatography comprise:
    a detection wavelength of 254 nm;
    a reference wavelength of 360 nm;
    a mobile phase of acetate with pH=5.5 as salt phase, acetonitrile as organic phase;
    a gradient elution;
    a column temperature of 25-50° C.;
    a flow rate of 1.0 mL/min;
    a sample volume of 20 μL; and
    a chromatography column flushing solvent of water and acetonitrile containing 0.1% trifluoroacetic acid.

6. The method of claim 5, wherein gradient mode parameters of the gradient elution comprise:
    a time gradient of 0→10→15→20 min;
    a concentration gradient of acetonitrile of 15%→22%→24%→15%; and
    a concentration gradient of 0.10 mol/L PH=5.5 ammonium acetate buffer solution of 85%→78%→76%→85%.

7. The method of claim 5, wherein the parameters of the high performance liquid chromatography further comprises:
    a detection wavelength bandwidth of 4 nm;
    a reference wavelength bandwidth of 100 nm;
    a column temperature of 37° C.; and
    a flow rate of 1 mL/min.

8. The method of claim 1, wherein the external standard method comprises:
    c) drawing a standard curve comprising: taking 40 μL of a mixed solution of mannose and glucose standard substances with the concentration of 0.5, 0.25, 0.10, 0.05, 0.025, 0.01, 0.005, 0.0025, 0.001 and 0.0005 mg/mL, adding 40 μL of 0.3M NaOH solution, adding 60 μL of 0.5M PMP solution, and heating at 70° C. n for 1 hour; taking out the reactant, cooling to room temperature, adding 80 μL of 0.3M HCl, extracting $CHCl_3$ three times; centrifuging at 13000 r/min for 10 min;

using high performance liquid chromatography to detect and analyze mannose and glucose respectively, and drawing a standard curve by taking the concentration of monosaccharide as a horizontal coordinate and taking the corresponding peak area as a vertical coordinate; and d) detecting the amount of mannose and glucose in a serum sample comprising: taking 10 μL of serum sample to be detected, adding 20 μL of ultrapure water and 10μL of 0.1 mg/ml rhamnose solution, and deriving and sampling; calculating the content of free mannose and glucose in the serum sample to be detected by using the standard curve obtained in the step c).

9. The method of claim 1, wherein the serum sample is from a patient with a disease is characterized by abnormal protein glycosylation.

10. The method of claim 9 wherein the disease is diabetes or gastric cancer.

* * * * *